United States Patent Office 3,420,648
Patented Jan. 7, 1969

3,420,648
MICROSCOPE COVER GLASS AND METHOD
Richard Charles Andrews, Wollaston, Stourbridge, and Arthur Hugh Bedford, West Hagley, Stourbridge, England, assignors to Chance Brothers Limited, Birmingham, England, a corporation of Great Britain
No Drawing. Filed Sept. 1, 1965, Ser. No. 484,470
Claims priority, application Great Britain, Sept. 18, 1964, 38,278/64
U.S. Cl. 65—66     6 Claims
Int. Cl. C03b 17/00; C03c 3/08

This invention relates to glass which has a refractive index of the order of .524 ($n_D$).

Glasses having a refractive index in the region 1.524 ($n_D$) have particular use as microscope cover slips. For microscope cover slips, however, it is important that the glass shall be durable so that its surface is not affected in any way by normal atmospheric conditions of temperature and humidity, for example when the glass slips are stored or packed together in boxes with their adjacent surfaces in contact.

Furthermore, glasses of the thicknesses ranging from 0.085 mm. to 0.350 mm. which are used as microscope cover slips are normally prepared by a drawing process, conveniently a down draw process, that is to say a process in which a thin sheet or ribbon of glass is formed by flowing and drawing the molten glass downwardly through a long, narrow, electrically heated slit in the bottom of a container, the slit being constantly supplied with glass from a furnace above it. In order that satisfactory glasses may be prepared by a drawing process it is important that the glass shall have particular devitrification and viscosity-temperature characteristics, and more particularly the devitrification temperatures of the glass should be below the temperature at which the glass sheet is formed, or, failing that, the rate of devitrification at the drawing temperature should be very, very low.

Hitherto the glasses which have been used in drawing processes for the manufacture of microscope cover slips have met the manufacturers' requirements regarding devitrification and viscosity-temperature characteristics and many of them have had the desired refractive index of the order of 1.524. However, the durability of these glasses has not been as good as is desired, with the result that deterioration of the microscope cover slips has taken place during storage or use. Consequently it is a main object of the present invention to provide a new glass which still meets the manufacturers' requirements and has the desired refractive index and which has improved durability characteristics.

According to the present invention there is provided a glass comprising as essential components by weight from 63 to 68% of silica ($SiO_2$), 6 to 10% sodium oxide ($Na_2O$), 3 to 7% potassium oxide ($K_2O$), 1.8 to 5% alumina ($Al_2O_3$), 4 to 9% boron oxide ($B_2O_3$), 1 to 4% barium oxide (BaO), 1.5 to 6% zinc oxide (ZnO), 1.5 to 4% titanium dioxide ($TiO_2$), 0.4 to 1% antimony oxide ($Sb_2O_3$) and 1 to 2% zirconia ($ZrO_2$).

Glass according to the present invention may further comprise up to 2% of magnesium oxide (MgO) and up to 5% calcium oxide (CaO).

A specific example of a glass in accordance with the present invention has the following composition:

| | Percent |
|---|---|
| $SiO_2$ | 65.0 |
| $Na_2O$ | 8.7 |
| $K_2O$ | 4.2 |
| $Al_2O_3$ | 4.2 |
| MgO | 1.0 |
| CaO | 2.3 |
| $B_2O_3$ | 6.8 |
| BaO | 1.4 |
| ZnO | 2.2 |
| $TiO_2$ | 2.2 |
| $ZrO_2$ | 1.4 |
| $Sb_2O_3$ | 0.6 |

This glass has a refractive index of 1.524±0.001 ($n_D$), a softening point of 743° C., and an alkalinity figure for durability determined according to British Standard 3473: 1962 Procedure A of 26 micrograms $Na_2O$/gram of glass. The glass with this composition was found not to devitrify when held at usual devitrification temperatures for 24 hours.

The glass exemplified herein is a greatly improved glass over former glasses as regards its durability characteristics. In this connection it is to be noted that the former glasses exhibited alkalinity figures (determined according to British Standard 3473: 1962 Procedure A) of the order of 170 micrograms $Na_2O$/gram of glass.

Experiments have shown that the presence in the glass of a proportion of zirconium oxide within the range mentioned improves the durability of a glass with the desired optical properties and that small amounts of barium oxide in a glass having the other components helps the optical properties, and particularly the refractive index, as well as the viscosity and the devitrification characteristics of the glass, and possibly also helps the durability.

Consequently the better durability of a glass in accordance with the present invention as compared with the former glasses is thought to be due to the combination with the other essential components of the glass of a small proportion of zirconium oxide and also a small amount of barium oxide.

The present invention further comprehends a method of producing microscope cover glasses comprising the steps of forming molten glass having as essential components by weight from 63 to 68% silica ($SiO_2$), 6 to 10% sodium oxide ($Na_2O$), 3 to 7% potassium oxide ($K_2O$), 1.8 to 5% alumina ($Al_2O_3$), 4 to 9% boron oxide ($B_2O_3$), 1 to 4% barium oxide (BaO), 1.5 to 6% zinc oxide (ZnO), 1.5 to 4% titanium dioxide ($TiO_2$), 0.4 to 1% antimony oxide ($Sb_2O_3$) and 1 to 2% zirconia ($ZrO_2$), and drawing a ribbon of glass having a thickness less than 0.350 mm. from this molten glass. Advantageously the ribbon of glass is drawn by the down draw process and has a thickness in the range 0.160 to 0.190 mm.

Microscope cover slips are then obtained from the ribbon of glass in the normal way and the present invention also comprehends such microscope cover slips.

We claim:
1. A glass consisting essentially of by weight from 63 to 68% silica ($SiO_2$), 6 to 10% sodium oxide ($Na_2O$), 3 to

7% potassium oxide ($K_2O$), 1.8 to 5% alumina ($Al_2O_3$), 4 to 9% boron oxide ($B_2O_3$), 1 to 4% barium oxide (BaO), 1.5 to 6% zinc oxide (ZnO), 1.5 to 4% titanium dioxide ($TiO_2$), 0.4 to 1% antimony oxide ($Sb_2O_3$) and 1 to 2% zirconia ($ZrO_2$).

2. A glass according to claim 1 further comprising up to 2% magnesia (MgO) and up to 5% calcium oxide (CaO).

3. A glass having the composition 65% $SiO_2$, 8.7% $Na_2O$, 4.2% $K_2O$, 4.2% $Al_2O_3$, 1.0% MgO, 2.3% CaO, 6.8% $B_2O_3$, 1.4% BaO, 2.2% ZnO, 2.2% $TiO_2$, 1.4% $ZrO_2$ and 0.6% $Sb_2O_3$.

4. A glass according to claim 1 having a refractive index in the range 1.524±0.001 ($n_D$).

5. A method of producing microscope cover glasses comprising the steps of forming molten glass consisting essentially of by weight from 63 to 68% silica ($SiO_2$), 6 to 10% sodium oxide ($Na_2O$), 3 to 7% potassium oxide ($K_2O$), 1.8 to 5% alumina ($Al_2O_3$), 4 to 9% boron oxide ($B_2O_3$), 1 to 4% barium oxide (BaO), 1.5 to 6% zinc oxide (ZnO), 1.5 to 4% titanium dioxide ($TiO_2$), 0.4 to 1% antimony oxide ($Sb_2O_3$) and 1 to 2% zirconia ($ZrO_2$), and drawing a ribbon of glass having a thickness less than 0.350 mm. from this molten glass.

6. Microscope cover glasses when produced by the method according to claim 5.

References Cited

UNITED STATES PATENTS

Re. 23,049  11/1948  Armistead _____ 106—54

FOREIGN PATENTS 551,390  3/1957  Belgium.

HELEN M. McCARTHY, *Primary Examiner.*

U.S. Cl. X.R.

106—54